United States Patent
Adar et al.

(10) Patent No.: US 8,335,785 B2
(45) Date of Patent: Dec. 18, 2012

(54) RANKING RESULTS FOR NETWORK SEARCH QUERY

(75) Inventors: Eytan Adar, Mountain View, CA (US); Li Zhang, Mountain View, CA (US); Lada Adamic, Los Altos, CA (US); Rajan Mathew Lukose, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2396 days.

(21) Appl. No.: 10/952,512

(22) Filed: Sep. 28, 2004

(65) Prior Publication Data

US 2006/0069663 A1    Mar. 30, 2006

(51) Int. Cl.
*G06F 7/00* (2006.01)
(52) U.S. Cl. ......................................... 707/725; 707/726
(58) Field of Classification Search .................. 707/723, 707/724, 725, 726, 727
See application file for complete search history.

(56) References Cited

U.S. PATENT DOCUMENTS

| | | | |
|---|---|---|---|
| 5,875,446 A * | 2/1999 | Brown et al. ..................... | 707/3 |
| 6,321,228 B1 | 11/2001 | Crandall et al. | |
| 6,421,675 B1 | 7/2002 | Ryan et al. | |
| 6,526,440 B1 | 2/2003 | Bharat | |
| 6,591,261 B1 | 7/2003 | Arthurs | |
| 6,718,324 B2 | 4/2004 | Edlund et al. | |
| 6,845,374 B1 * | 1/2005 | Oliver et al. ..................... | 707/5 |
| 2002/0169760 A1 * | 11/2002 | Cheung et al. .................... | 707/3 |
| 2003/0060910 A1 * | 3/2003 | Williams et al. ................. | 700/91 |

OTHER PUBLICATIONS

Sergey Brin and Lawrence Page, The Anatomy of a Large-Scale Hypertextual Web Search Engine, Computer Science Dept, Stanford Univ,1998, 20 pages. http://www-db.stanford.edu/backrub/google.html.
Daniel Gruhl et al, Information Diffusion Through Blogspace, WWW 2004, May 1722, 2004, New York, New York, ACM 1-58113-844-X/04/0005. 28 pages. http://www.tomkinshome.com/papers/2Web/idib.html/idib.html.
Eytan Adar et al, Imkplicit Structure and the Dynamics of Blogspace, HP Information Dynamics Lab, May 2004, 8 pages, http://www.hpl.hp.com/research/idl/papers/blogs/blogspace-draft.pdf.
Peter Pirolli et al, Silk from a Sow's Ear: Extracting Usable Structures from the Web, Xerox Palo Alto Research Center, 1996.

* cited by examiner

*Primary Examiner* — Robert Beausoliel, Jr.
*Assistant Examiner* — Nirav K Khakhar

(57) ABSTRACT

A method and system for ranking results for a network search query. The method includes receiving a network search query; obtaining weblogs relevant to the search query from a database; scoring the weblogs based on a time when information pertaining to the search query appeared on weblogs; and displaying a ranking of the weblogs.

20 Claims, 2 Drawing Sheets

RANKING RESULTS FOR NETWORK SEARCH QUERY

BACKGROUND

The amount of information available on the World Wide Web (the internet) and other networks is enormous and rapidly expanding. Searching and locating specific aspects of this information can be quite challenging.

Search engines seek and retrieve network information that relates to a specific request or query. An internet search engine, for example, uses a web crawler (or web spider) to search the internet to retrieve, copy, index, and store web pages and related information. Typically, the contents of each web page are analyzed to determine how the page should be indexed. Words may be extracted from the titles, headings, or special fields known as meta tags. Data concerning each page is then stored in an index database. During a search, a user enters a query, such as key words. The search engine compares the query with the index database and provides a listing of most relevant web pages according to the key words.

One goal of a search engine is to provide the user with the most relevant search results based on the initial query. The task of providing relevant search results is quite complex since thousands to millions of web pages may contain the particular key words entered in the query. In order to cull through the resulting web pages, many search engines employ methods to rank the search results so the user is presented with the most relevant results first.

Search engines utilize various schemes (such as ranking algorithms) to rank the search results. Accurately ranking a web page is difficult since the importance of a web page to a user is inherently subjective. To increase ranking accuracy, some search engines use page ranking to assign weights or scores to web pages. For example, web pages can be ranked accordingly to criteria other than content, such as the popularity of a page, the number of citations or backlinks to a page, or the quality of a page.

Ranking web pages according to popularity or backlinks to a page does not necessarily ensure that the most relevant pages are being presented to the user. A web page, for example, may be popular with large numbers of internet users. This popular web page, though, may not be the most authoritative or relevant site to the search query.

SUMMARY

Embodiments in accordance with the present invention are directed to a method, apparatus, and system for ranking results for a network search query. The method includes receiving a network search query; obtaining weblogs relevant to the search query from a database; scoring the weblogs based on a time when information pertaining to the search query appeared on weblogs; and displaying a ranking of the weblogs.

Other embodiments and variations of these embodiments are shown and taught in the accompanying drawings and detailed description.

DETAILED DESCRIPTION

Figure 1:
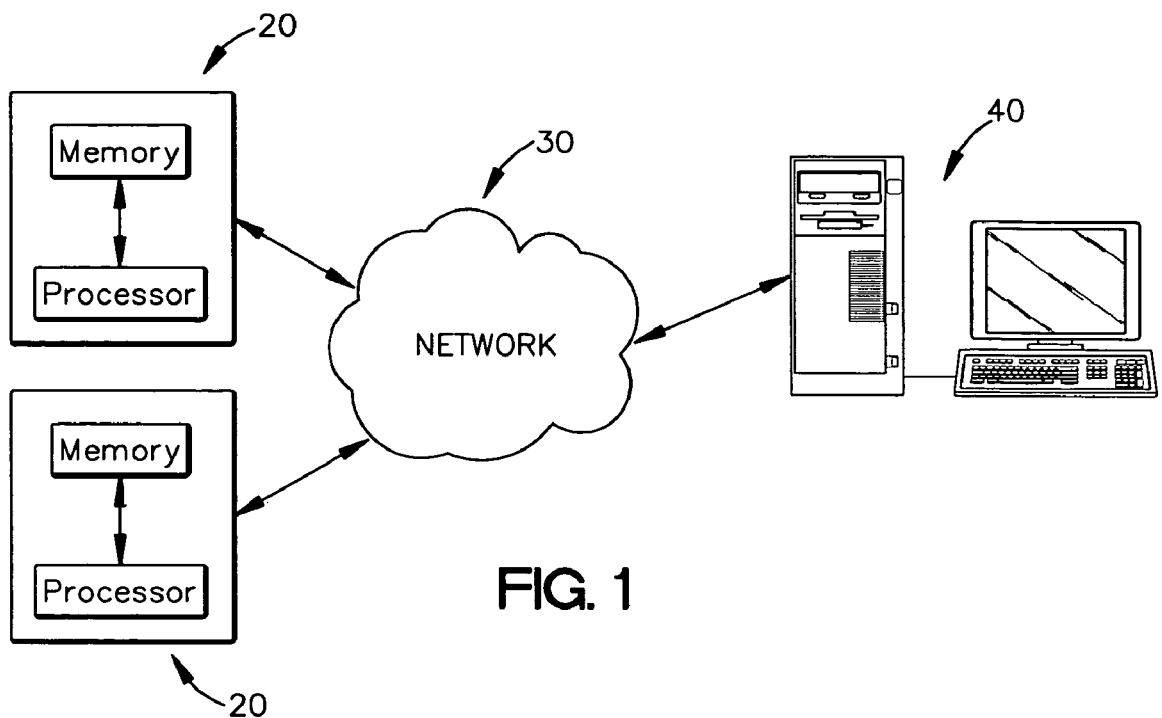
FIG. 1 illustrates an exemplary data processing network in accordance with an embodiment of the present invention.

FIG. 1 illustrates an exemplary system or data processing network in which an embodiment in accordance with the present invention may be practiced. The data processing network includes a plurality of computing devices 20 in communication with a network 30 that is in communication with a computer system or server 40.

For convenience of illustration, only a few computing devices 20 are illustrated. The computing devices include a processor, memory, and bus interconnecting various components. Embodiments in accordance with the present invention are not limited to any particular type of computing device since various portable and non-portable computers and/or electronic devices may be utilized. Exemplary computing devices include, but are not limited to, computers (portable and non-portable), laptops, notebooks, personal digital assistants (PDAs), tablet PCs, handheld and palm top electronic devices, compact disc players, portable digital video disk players, radios, cellular communication devices (such as cellular telephones), televisions, and other electronic devices and systems whether such devices and systems are portable or non-portable.

The network 30 is not limited to any particular type of network or networks. The network 30, for example, can include a local area network (LAN), a wide area network (WAN), and/or the internet or intranet, to name a few examples. Further, the computer system 40 is not limited to any particular type of computer or computer system. The computer system 40 may include personal computers, mainframe computers, servers, gateway computers, and application servers, to name a few examples.

Those skilled in the art will appreciate that the computing devices 20 and computer system 40 may connect to each other and/or the network 30 with various configurations. Examples of these configurations include, but are not limited to, wireline connections or wireless connections utilizing various media such as modems, cable connections, telephone lines, DSL, satellite, LAN cards, and cellular modems, just to name a few examples. Further, the connections can employ various protocol known to those skilled in the art, such as the Transmission Control Protocol/Internet Protocol ("TCP/IP") over a number of alternative connection media, such as cellular phone, radio frequency networks, satellite networks, etc. or UDP (User Datagram Protocol) over IP, Frame Relay, ISDN (Integrated Services Digital Network), PSTN (Public Switched Telephone Network), just to name a few examples. Many other types of digital communication networks are also applicable. Such networks include, but are not limited to, a digital telephony network, a digital television network, or a digital cable network, to name a few examples. Further yet, although FIG. 1 shows one exemplary data processing network, embodiments in accordance with the present invention can utilize various computer/network architectures. Various alternatives for connecting servers, computers, and networks will not be described as such alternatives are known in the art.

For convenience of illustration, an exemplary embodiment in accordance with the invention is illustrated in conjunction with a search engine. This illustration, however, is not meant to limit embodiments of the invention with search engines. Further, embodiments in accordance with the invention do not require a specific search engine. The search engine may be any kind of search engine now known or later developed. For example, embodiments in accordance with the invention can be used in conjunction with existing search engines (such as PageRank) or search engines developed in the future.

Figure 2:
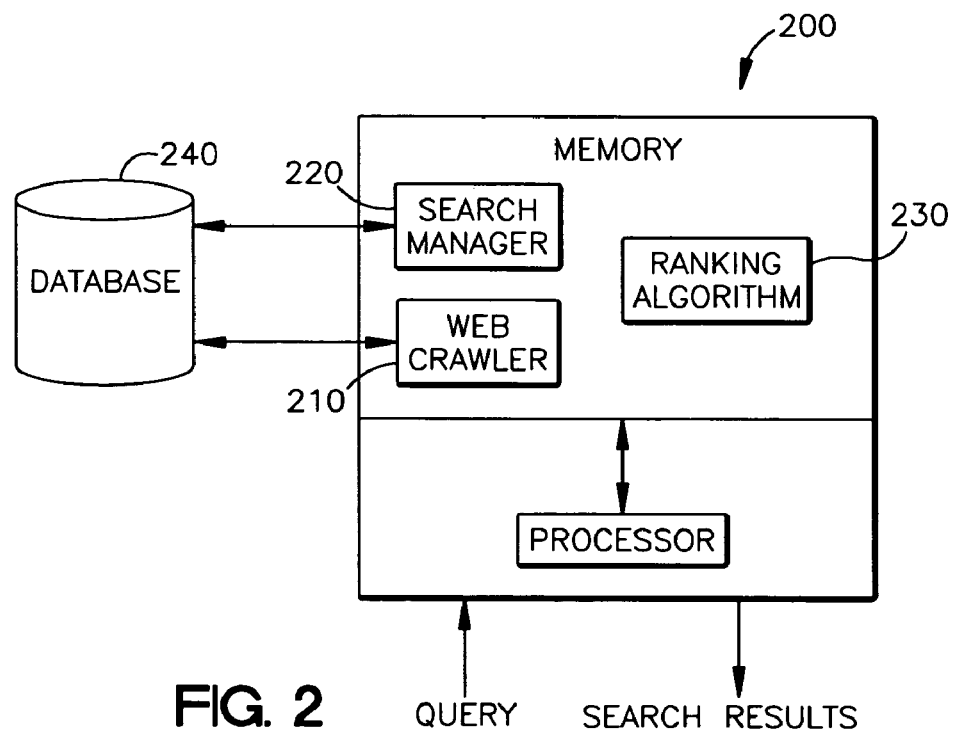
FIG. 2 illustrates an exemplary search engine in accordance with the present invention.

FIG. 2 illustrates an exemplary search engine 200. As one example, the search engine 200 can be a program stored in the memory of computer system 40. The program is generally designed to assist a user or computing device in accessing files stored on a computer, for example a server on the World Wide Web (internet). The search engine enables a user to request information or media content having specific criteria. The request, for example, can be entered as keywords or a query. Upon receiving the query, the search engine retrieves documents, files, or information relevant to the query.

For simplicity of illustration, the search engine 200 includes a web crawler 210, a search manager 220, and a ranking algorithm 230. The search engine 200 is discussed in connection with the flow diagram of FIG. 3.

Per block 300, the web crawler crawls or searches the network and builds an associated database 240. The web crawler 210 is a program that browses or crawls networks, such as the internet, in a methodical and automated manner in order to collect or retrieve data for storage. For example, the web crawler can keep a copy of all visited web pages and indexes and retain information from the pages. This information is stored in the database 240. Typically, the web crawler traverses from link to link (i.e., visits uniform resource locators, URLs) to gather information and identify hyperlinks in web pages for successive crawling.

One skilled in the art will appreciate that numerous techniques can be used to crawl a network, and embodiments in accordance with the present invention are not limited to any particular web crawler or any particular technique. As one example, when web pages are encountered, the code comprising each web page (e.g., HyperText Markup Language or HTML code) is parsed to record its links and other page information (example, words, title, description, etc.). A listing is constructed containing an identifier (example, web page identifier) for all links of a web page. Each link is associated with a particular identifier. The listing is sorted using techniques known in the art to distinguish the web pages and respective links. The relationship of links to the parsed web pages and the order of the links within a web site are maintained. After sufficient web sites have been crawled, the recorded or retrieved information is stored in the database 240.

The network can be crawled, for example, at predetermined time intervals (example, continuously, hourly, weekly, etc.). As the network is crawled, the database 240 is continually refreshed with the newly discovered information. Further, as each web page is crawled, a time-stamp associated with the content of the web page is saved. The time-stamp records a time when information appeared on a webpage and can be used to verify a time (example, second, minute, hour, day, etc.) when information existed or appeared on the webpage.

Once the database 240 is created, the search engine 200 can process search queries and provide search results. One skilled in the art will appreciate that numerous techniques can be used to process search queries and provide search results, and embodiments in accordance with the present invention can be utilized with various techniques.

Per block 310, the search manager 220 receives a query (such as keywords) from a user or computing device (such as computing device 20 in FIG. 1). The search manager 220 can perform a multitude of different functions depending on the architecture of the search engine, By way of example and not to limit embodiments of the invention, the search manager 220 could track user sessions, store state and session information, receive and respond to search queries, and coordinate the web crawler and ranking algorithm, to name a few examples.

Per block 320, the search engine accesses the database 240 to find or retrieve information that correlates to the query. As an example, the search manager 220 could retrieve from the database 240 all web sites that have a title and description matching keywords in the query.

Per block 330, the search manager 220 initiates the ranking algorithm 230 to score and rank the information (example, the retrieved web sites) retrieved from the database 240.

Per block 340, the ranked information is then displayed to the user or provided to the computing device. The information may be displayed, for example, in a hierarchical format with the most relevant information (example, information with the highest score) presented first and the least relevant information (example, information with the lowest score) presented last.

If a modified or new search is requested, per block 350, then the flow diagram loops back to block 310; otherwise, the flow diagram ends 360.

In general, the ranking algorithm 230 identifies or tracks the evolution, progress, or development of information over time in a network. If the network is the internet, for example, the ranking algorithm identifies websites that are important to the conception, propagation, development, or expansion of information across the internet. A website, for example, would be identified for being an early detector or generator of information that is pertinent to the query. Websites are scored or ranked based on how early they detect, recognize, and/or originate information that is relevant to the query. Websites are also scored or ranked based on how they influence the propagation or dissemination of information through the network. For example, websites that conceive, discover, or recognize information early or first are, thus, given a higher score than websites that subsequently conceive, discover, or recognize the same or similar information. The time (i.e., second, minute, hour, day, month, year, etc.) when a website first acknowledges existence of the information is thus important for scoring and ranking the website in the ranking algorithm 230.

In one embodiment in accordance with the present invention, the content of a network location (for example, the content of a webpage, document on a network, weblog, etc.) is time-stamped to indicate when the content originated at the network location. The time-stamp of the content is used as a factor for scoring the network location. Time (for example, as it relates to when the content or information first appears or originates on a network location, such as in a document) can be captured and stored in a variety of ways. As one example, as the networked is being crawled, a time-stamp associated with information or content of a website can be saved and stored. The time-stamp gives the time (example, second, minute, hour, day, and year) corresponding to when the information or content first appeared or was modified at the network location (such as a website). The time-stamp and corresponding information can be stored together in the database 240 as discussed in connection with block 300 in FIG. 3. Thus, when the document is retrieved from the database 240 per a search request (as in block 320), the time-stamp associated with the content of the document can simultaneously be retrieved. The time-stamp can provide the time when the information first appeared (example, first originated) or was modified at the network location or website.

As noted, time-stamp information can be captured in many ways. As another example, a network location (such as a webpage) can be repeatedly or continuously crawled and the content of the network location saved. Time-stamp information associated with content that occurs at a network location can be derived by comparing previous content with new content. For example, suppose a webpage is crawled and content X is retrieved at a given time A. Later at time B (Time A plus any increment of time, such as second, minute, etc.), the same webpage is crawled and content Y is retrieved. A comparison of contents X and Y will reveal what new or different information is present at the webpage, and a time-stamp can be associated with this new or different information.

Weblogs can also be used to obtain time-stamp information. A weblog (also known as a blog) is a web application that contains periodic, reverse chronological ordered posts or message on a webpage. Weblogs thus contain time ordered entries that can be viewed and saved. Weblogs are typically publicly accessible to any user of the internet and range from simple individual diaries to large and complex corporate communication forums. The format of weblogs varies from simple bullet lists of hyperlinks to summaries of articles or topics with user-provided comments and ratings. Individual weblog entries typically include a date and time-stamp for entries or modifications of information, with the newest addition of information or post at the top of the page. Furthermore, most weblogs are adapted to archive older entries and generate a static address (known as a permalink) for individual entries. The latest headlines, with hyperlinks and summaries, are offered in formats such as RSS (Really Simple Syndication) XML (Extensible Markup Language) format and read with an RSS feedreader. Furthermore, a weblog, for example, can be run through a content management system, CMS.

The ranking algorithm 230 can be utilized in various embodiments in accordance with the present invention, such as influence weighing and link inference. Both of these examples are discussed in connection with weblogs and/or URLs, but embodiments in accordance with the present invention are not restricted to weblogs, URLs, the internet, or any particular network embodiment. Weblogs and URLs are discussed for illustration purposes.

Influence weighing adds points to weblogs that mention or note information early in the trend, development, or evolution of the information. In the context of the internet, for example, assume the website A mentions or provides information on topic A. Later, other websites B, C, and D mention or provide information on topic A. The ranking algorithm 230 adds points to website A or scores website A more heavily according to how many other sites (example, websites B, C, D, etc.) later mention the same or similar information. Thus, a website is scored based on how early the site detects or influences information relevant to the search query. In one exemplary embodiment in accordance with the present invention, influence weighting assigns a higher score to network locations (example, webpages or weblogs) that mention information earlier than other network locations.

Using weblogs as an example, influence weighting assigns a score $s_{ub}$ to every weblog b that mentioned URL u on day $d_b$. The score is represented mathematically as follows:

$$s_{ub} = \sum_x (d_x - d_b)$$

So, for every other weblog x that mentioned the URL on day $d_x$, points are added that equal the difference $(d_x - d_b)$ in days between the mentions to weblog b. If weblog x mentions the URL a day later, one point is added weblog b; for every weblog that mentioned the URL two days later, two points are added; for every weblog that mentioned the URL three days later, three points are added, etc. Weblogs that mention the URL on the same day do not affect each other's scores, and if weblog x mentions a URL m days before weblog b, m is subtracted from weblog b's score. Of course, this scoring scheme is exemplary, and many other scoring schemes can be utilized with embodiments in accordance with the present invention. For example, this scoring scheme uses time measured in days; a different scoring scheme could be used if finer-grained timing information (example, seconds, minutes, or hours) is available.

URLs whose citations are spread out over a number of days will have a greater effect on the difference in scores for weblogs mentioning the URL, because the difference in time between mentions will tend to be larger. Other URLs that peak and wane on the same day, such as some news articles, will have a smaller effect on blog scores because mentions are spaced closely together.

The overall score assigned to each weblog is the average of the scores of each URL it cited. The overall score is represented mathematically as follows:

$$s_b = \left(\sum_u s_{ub}\right) / n_b$$

Here, $n_b$ is the number of URLs cited on weblog b.

Averaging over all URLs helps bring down the score of link aggregators that may mention all the new URLs detected on other weblogs without filtering for interest or quality.

Preferably, only URLs that are truly new and have appeared for the first time during the time period selected are considered. Otherwise, URLs for webpages that have been present for quite some time (such as Yahoo.com, CNN.com, etc.) might give erroneously high scores to weblogs that happen to be the first to mention them during the time period considered. Further, certain URLs can be ignored or given lower scores. For example, a list of URLs to ignore can be stored so when the URL appears in a search, the listed URL is ignored.

Influence weighting is not restricted to scoring weblogs based on when they mention URLs (these URLs can be restricted to a topic or include all URLs). Other factors or information could be used instead of or in addition to the set of URLs. Such factors or information could include, for example, words, phrases, symbols, numbers, characters, colors, sounds, shapes, etc.

As noted, the ranking algorithm 230 can also utilize link inference. In general, link inference predicts possible routes or paths of information flow or information propagation in order to add implicit links (i.e., links not actually appearing on a webpage) to explicit links (i.e., links actually appearing on a webpage) in a website. Further, link inference takes into account how information (example, URLs, text, documents, etc.) travels or propagates between network locations (example webpages or weblogs) and then ranks the network locations based on how important the network location is to information propagation. In other words, link inference identifies network locations that serve as sources of information that later become linked-to from other network locations. For example, an examination can be made as to how the same information travels, moves, or migrates from webpage A to webpage B to webpage C, etc.

In one exemplary embodiment of the invention, link inference creates weighted edges between, for example, documents and then utilizes a ranking algorithm (example, PageRank or other algorithm) to assign scores to the document. Link inference is discussed in connection with two examples: chronological inference and machine learning based inference.

Chronological inference is discussed first. Again, using weblogs, URLs, and the internet as an example, the ranking algorithm 230 infers possible routes that information may have traveled through the internet to arrive at particular websites. Based on the route scores, some subset of more likely routes can be extracted. Thus for a given URL, a directed link is constructed for any two weblogs $b_i$ and $b_j$, when $b_j$ cites the URL before or on the same day as $b_i$. Note that each weblog has a directed edge to itself. This directed edge corresponds to the likelihood that the information is obtained from an external source. The weights of those self-pointing edges are summed up and redistributed to all the weblogs. This redistribution prevents weblogs from draining all the weights that are assigned. Since not all links are equally possible, edges are weighted. For purposes of illustration, the internet is modeled as a graph in which nodes correspond to webpages, and edges correspond to hyperlink on the webpages. Further, appearances and propagation of information (example, URLs, text, etc.) can be tracked or predicted, and any new network locations (example, webpages or weblogs) containing the information are infected.

The edges can be weighted with different factors. For example, one factor to utilize is the diminishing infectiveness of information over time. In other words, those weblogs that obtained or generated the information earlier will frequently push or move the information (example, URLs) into their archives or into other less visible locations. Table 1 illustrates an example of one weighting scheme. In this scheme, weights decrease as the number of days between citations increases.

TABLE 1

| | $\Delta d$ | | | | | | | |
|---|---|---|---|---|---|---|---|---|
| | 0 | 1 | 2 | 3 | 4 | 5 | 6 | 7 | >7 |
| Weight, $w(\Delta d)$ | 2 | 7 | 6 | 5 | 4 | 3 | 2 | 1 | 0 |

As shown in Table 1, the weights assigned to links depend on the difference between the days a weblog cites a URL ($\Delta d$). The low weight assigned to ($\Delta d$)=0 is intended to control for the fact that web crawls are performed on a daily basis and ordering in this case is unclear.

For each pair of weblogs $b_i$, $b_j$ that cites a URL u, on days $d_i$, and $d_j$ respectively, a weight is assigned as follows: $w_{ji}^u = w(\Delta d_{ji})$, where $d_{ji} = d_j - d_i$. Suppose that $b_j$ contains $n_j$ URLs. A link is then formed from $b_i$ to $b_j$ with the following weight:

$$\frac{w_{ji}^u}{n_j \sum_k w_{jk}^u}.$$

Under such an assignment, the total weights of the outgoing edges from each weblog sum to one. For those self-pointing edges, an artificial node is added. This artificial node represents the external sources and redirects each self-pointing edge to point to that node. Then, the rating is redistributed by adding a directed edge from this external node to every weblog with a uniform weight that sums up to one.

After all the URLs are considered, edges are merged to form a directed graph. The weights on the same edge are added to form the directed graph, also called an implicit information flow graph.

Machine learning based inference is now discussed. This inference utilizes a more complex and potentially more accurate system for constructing the implicit information flow graph. Specifically, this inference uses the extraction of a number of features and subsequent training of a classifier.

Due to the small number of directly attributable infections (i.e., flow of information from one weblog, website, or network location to another), the inference does not attempt to train on true infections (although this data is preferable if available). Instead, the inference gathers a sample by randomly selecting weblog pairs from the explicit network. Thus, a determination is made as to where a link should exist between strongly related weblogs (i.e. one weblog should know of the existence of the other weblog even if the two weblogs do not directly link). Here, some assumptions are made. For example, the inference assumes that a classifier that can "predict" the explicit links should also be effective in predicting implicit links. The classifier uses four main features that relate one weblog to another in order to predict links on which an infection (example, information) may travel or propagate:

(1) the number of weblogs explicitly linked together in common (indicating whether two weblogs are in the same community).
(2) the number of non-weblog links (example "memes" or URLs) shared by the two weblogs;
(3) text similarity between the two weblogs; and
(4) the order of meme appearance (i.e., the number of times one weblog mentions a URL before the other, and the number of times both weblogs mentions the URL on the same day).

The first two features are similarity metrics derived from blog-blog links and blog-meme links. The similarity can be computed from a cosine similarity measure that ranges between 0 (no overlap in URLs) to 1 (all URLs are shared). If $n_A$ and $n_B$ are the numbers of URLs found in weblogs A and B, and $n_{AB}$ is the number of shared URLs, then the similarity is computed as follows:

$$s(A,B) = n_{AB}/\sqrt{n_a}/\sqrt{n_b}.$$

The third feature, textual similarity, can be determined from a cosine similarity metric on a term-frequency, inverse document frequency (TF-IDF) weighted vector representing the textual content of the weblog. The similarity metric follows a pattern wherein unlinked pairs of weblogs are less textually similar on average than linked pairs of weblogs.

Time-stamps and timing of URL citations at websites can be automatically collected with the search engine, for example, during web crawling. The search engine, thus, can determine when (i.e., at what, time) information first appears or is modified at a network location. This information is stored in the database 240 and used in the ranking algorithm 230. The search engine can gather and store data indicating when one weblog acquired or modified information pertaining to a specified query. As a first example, if weblog A consistently cites the same URLs before weblog B, then weblog A is scored more heavily. Further, an assumption can be made that weblog A is a possible source of the information for weblog B. As a second example, the websites of various news agencies (such as Cable News Network (CNN), Microsoft Network (MSN), etc.) can be continuously crawled. A time-stamp is associated with information as it appears on the website. If website A cites the same or similar information before website B, then website A is scored more heavily in the ranking of search results (see block 330 in FIG. 3).

One skilled in the art will appreciate that the ranking algorithm can be applied or modified in numerous ways and still be within embodiments in accordance with the invention. Various weights, scores, and probabilities can be applied or assigned in the ranking algorithm to produce more relevant search results. Further, various scores and probabilities can be generated and used to eliminate unlikely links or rank some links higher than other links.

The following example illustrates how various algorithms (such as self-learning heuristic programs) can implement various rules in accordance with embodiments of the present invention. Assume, for example, the existence of websites A and B (or weblogs A and B). The following rules can be provided:

(1) A highest confidence exists in a link from B to A if B explicitly states that the information came via A. This explicit statement, for example, could be "got link X via A." If B states receipt of the link from A but it cannot be determined when A mentioned the link, then an assumption can be made that A cited the link the day before B.

(2) If no explicit statement exists, then an examination is made for explicit links from B to other websites or weblogs. Such other websites or weblogs are chosen based on the highest inference score(s).

(3) If no connection exists between B and A but there is a link from A to B, then consider this information to be the next most possible option.

(4) If no explicit text mentions exist at all, then utilize implicit link(s) with the highest score(s).

A network location (such as website or weblog) can increase its score in various ways. For example, if the network location has a wide or large readership or hit occurrence, then mentioning particular information (such as a specific URL) will likely spur subsequent discussion of the linked-to information on other network locations. On the other hand, if the network locations does not have a large readership or hit occurrence, then the network location can still receive a high score if it consistently or regularly mentions the particular information (such as a specific URL) before other network locations.

The ranking algorithm can include various features to control or compensate for spamming or other means to artificially inflate the score given to a network location. For example, a user could duplicate a website or weblog many times to artificially create popular URL infections. Alternatively, a user could automatically list many fresh links on a website each day in an effort to propagate the links. To address these artificial inflations, the ranking algorithm can filter out information or URLs that are not sufficiently cited (i.e. have not reached a certain popularity). As an example, the ranking algorithm can have a threshold (example, 10 to 20 citations) to counter spamming by duplicate sites. More artificially created duplicates (such as a scheme creating a cluster of webpages) could be used to circumvent the threshold. To counter this scenario, the ranking algorithm can be programmed to detect a cluster of websites or weblogs that consistently mention similar sets of URLs and give lower scores to those intra-cluster links. In the case of a chronological inference technique, for example, the ranking algorithm can multiply the rating by a ratio determined by the fraction of leftover URLs cited by a weblog or website.

In the various embodiments in accordance with the present invention, embodiments are implemented as one or more computer software programs. The software may be implemented as one or more modules (also referred to as code subroutines, or "objects" in object-oriented programming). The location of the software (whether on the client computer or elsewhere) will differ for the various alternative embodiments. The software programming code, for example, can be accessed by the processor of the computing device 20 and computer system 40 from long-term storage media of some type, such as a CD-ROM drive or hard drive. The software programming code may be embodied or stored on any of a variety of known media for use with a data processing system or in any memory device such as semiconductor, magnetic and optical devices, including a disk, hard drive, CD-ROM, ROM, etc. The code may be distributed on such media, or may be distributed to users from the memory or storage of one computer system over a network of some type to other computer systems for use by users of such other systems. Alternatively, the programming code may be embodied in the memory, and accessed by the processor using the bus. The techniques and methods for embodying software programming code in memory, on physical media, and/or distributing software code via networks are well known and will not be further discussed herein.

Figure 3:
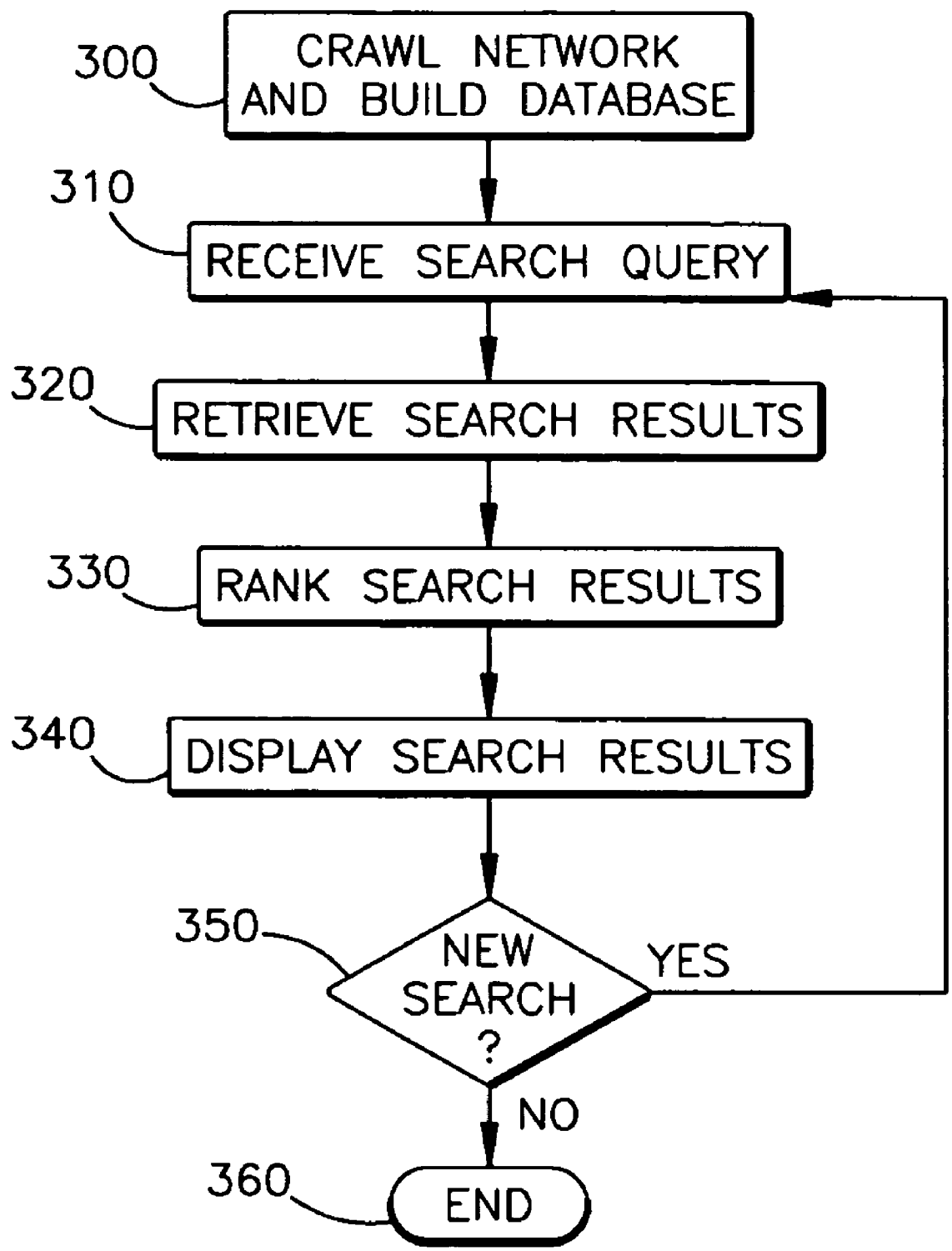
FIG. 3 illustrates an exemplary flow diagram in accordance with the present invention.

The flow diagram of FIG. 3 (and accompanying description to FIGS. 1 and 2) should not be strictly construed as limiting embodiments in accordance with the present invention. One skilled in the art will appreciate that the flow diagram may be combined and/or rearranged with no loss of generality, and procedural steps or blocks may be added, subtracted, altered, and/or rearranged by one skilled in the art depending on the intended target application.

While the invention has been disclosed with respect to a limited number of embodiments, those skilled in the art will appreciate, upon reading this disclosure, numerous modifications and variations. It is intended that the appended claims cover such modifications and variations and fall within the true spirit and scope of the invention.

What is claimed is:

1. A method, comprising:
   receiving a network search query;
   obtaining weblogs relevant to the search query from a database;
   scoring the weblogs based on (1) a time-stamp indicating when information pertaining to the search query appeared on weblogs and (2) a network flow path, through the weblogs, of information pertaining to the search query; and
   displaying a ranking of the weblogs.

2. The method of claim 1 wherein scoring the weblogs further comprises assigning a score based on how early in time a weblog first mentions information relevant to the search query and on how influential a weblog is to propagate information relevant to the search query through the network to other weblogs.

3. The method of claim 1 wherein scoring the weblogs further comprises assigning a higher score to weblogs that mention, earlier in time, information pertaining to the search query than weblogs that mention, later in time, information pertaining to the search query.

4. The method of claim 1 wherein scoring the weblogs further comprises assigning an equivalent score to different weblogs if the different weblogs post information pertaining to the search query on a same day.

5. The method of claim 1 wherein scoring the weblogs further comprises scoring each weblog based on how early in time a weblog mentions a uniform resource locator (URL) associated with the search query and on how many other weblogs later mention the URL associated with the search query.

6. The method of claim 1 wherein scoring the weblogs further comprises:

determining when in time a first weblog cited information pertaining to the search query;

determining how many other weblogs later in time received the information pertaining to the search query from the first weblog.

7. A computer-readable medium having computer-readable program code embodied therein for causing a computer system to perform:

receiving plural uniform resource locators (URLs) that are relevant to a network search query;

assigning scores to internet weblogs based on (i) when in time the weblogs mention a URL in the plural URLs, and (ii) a flow path of the URLs between the weblogs; and ranking the weblogs based on the score assignments.

8. The computer-readable medium of claim 7 wherein higher scores are assigned when weblogs mention a particular URL earlier in time than when weblogs mention the particular URL later in time.

9. The computer-readable medium of claim 7 wherein assigning scores is further based on (iii) when a particular URL first appears on a particular weblog, and (iv) how many other weblogs mention the particular URL after the particular URL first appeared on the particular weblog.

10. The computer-readable medium of claim 7 wherein assigning scores is further based on (iii) predicting the flow path of URLs that are relevant to the search query from one weblog to another weblog.

11. The computer-readable medium of claim 7 wherein a higher score is assigned to a first weblog than to a second weblog, if the first weblog mentions a particular URL during a period of time more frequently than the second weblog mentions the particular URL during the period of time.

12. The computer-readable medium of claim 7 wherein assigning scores is based, in part, on when in time a weblog cites a URL.

13. A computer system, comprising:

memory that stores an algorithm;

processor that executes the algorithm to:

receive a network search query;

retrieve weblogs that are relevant to the search query; and score the weblogs based on (i) a time and date when information pertaining to the search query was cited in the weblogs, (ii) a number of different weblogs that cited information pertaining to the search query, and (iii) a network path of how information pertaining to the search query flowed between the weblogs.

14. The computer system of claim 13 wherein the processor further executes the algorithm to predict the network path through the weblogs during a time period by using (1) explicit links between weblogs, and (2) text similarity between weblogs.

15. The computer system of claim 13 wherein the processor further executes the algorithm to examine a first weblog citing a first URL to determine if the first weblog received the first URL from a second weblog.

16. The computer system of claim 15 wherein the processor further executes the algorithm to examine the first weblog for an explicit statement that the first weblog received the first URL from the second weblog.

17. The computer system of claim 15 wherein the processor further executes the algorithm to examine the first weblog for explicit internet links to the second weblog.

18. The computer system of claim 13 wherein the weblogs are further based on (iv) a number of times a weblog mentions, over a period of time, a URL relevant to the search query.

19. The computer system of claim 18 wherein the weblogs are further based on (v) a length of time between citations of the URL at the weblog.

20. The computer system of claim 13 wherein the weblogs are further based on (iv) a number of non-weblog links shared by two weblogs.

* * * * *